United States Patent
Guerinon

(10) Patent No.: US 7,210,512 B2
(45) Date of Patent: May 1, 2007

(54) TIRE WITH NON-LINEAR ANCHORING OF THE REINFORCEMENT STRUCTURE

(75) Inventor: Bernard Guerinon, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 56 days.

(21) Appl. No.: 11/038,399

(22) Filed: Jan. 21, 2005

(65) Prior Publication Data

US 2005/0189058 A1  Sep. 1, 2005

Related U.S. Application Data

(63) Continuation of application No. PCT/EP03/05534, filed on May 27, 2003.

(30) Foreign Application Priority Data

Jul. 23, 2002  (FR) .................................. 02 09355

(51) Int. Cl.
*B60C 15/05* (2006.01)
*B60C 15/00* (2006.01)
*B60C 15/06* (2006.01)

(52) U.S. Cl. ....................... 152/543; 152/539; 152/545; 152/547; 152/550

(58) Field of Classification Search ................. 152/539, 152/543, 545, 547, 550
See application file for complete search history.

(56) References Cited

U.S. PATENT DOCUMENTS 2,966,933 A  1/1961  Boussu et al.
5,232,033 A  8/1993  Durif

FOREIGN PATENT DOCUMENTS

WO  WO-02/00455 A1 *  1/2002
WO  WO 02/30690 A1   4/2002

* cited by examiner

*Primary Examiner*—Adrienne C. Johnstone
(74) *Attorney, Agent, or Firm*—Buchanan Ingersoll & Rooney PC

(57) ABSTRACT

A tire includes a carcass-type reinforcement structure anchored on either side of the tire in a bead. Each of the beads includes an anchoring zone having a plurality of circumferential cord windings cooperating with the adjacent portion of the reinforcement structure. The cord windings are arranged to form a cord stack in which the distance between the cord of a radially innermost winding and an adjacent portion of the reinforcement structure differs from the distance between the cord of the radially outermost winding and an adjacent portion of the reinforcement structure, wherein the stack is non-parallel to the reinforcement.

9 Claims, 3 Drawing Sheets

US 7,210,512 B2

TIRE WITH NON-LINEAR ANCHORING OF THE REINFORCEMENT STRUCTURE

This application is a Continuation of International Patent Application Serial No. PCI/EP03/005534 filed on May 27 2003, and which published as WO 2004/009380 on Jan. 29, 2004.

The present invention relates to tires. More particularly, it relates to the anchoring of the carcass-type reinforcement structure in the beads of the tire.

BACKGROUND OF THE INVENTION

The carcass reinforcement of tires is currently constituted by one or more plies, most frequently radial ones, which are turned up about one or more bead wires arranged in the beads. This turning-up of the ply around the bead wire constitutes the means making it possible to fix or anchor the ply in the bead.

However, there are nowadays tires which do not have the conventional upturn of the carcass ply around a bead wire, or even a bead wire, in the conventional sense of this element. For example, document EP 0 582 196 describes a manner of arranging a reinforcement structure of carcass type in the beads, by arranging adjacent to said reinforcement structure circumferential filaments, the whole being embedded in an anchoring or bonding rubber mix, preferably of high elasticity modulus. Several arrangements are proposed in this document. Generally, the spacing or distance between the circumferential cords and the carcass-type reinforcement structure is substantially constant along the entire anchoring zone. Thus, the taking up, by the circumferential cords, of the forces induced by the reinforcement structure takes place first and foremost and in a major part by the circumferential cords located radially internally. There is then less force to be recovered by the other circumferential cords of the anchoring zone.

Furthermore, one and the same distance is observed between the circumferential cords and the carcass-type reinforcement structure both in the radially inner portion, in which the movements are limited, and in the radially outer portion, where the movements or displacements are greater due to the displacement of the sidewall towards the outside under the action of the pressure or the forces induced for example when cornering.

SUMMARY OF INVENTION

In order to overcome these different drawbacks, the invention provides a tire comprising at least one carcass-type reinforcement structure anchored on either side of the tire in a bead, the base of which is intended to be mounted on a rim seat, each bead being extended radially towards the outside by a sidewall, the sidewalls radially towards the outside joining a tread, the carcass-type reinforcement structure extending circumferentially from the bead towards said sidewall, a crown reinforcement, each of the beads furthermore comprising an anchoring zone permitting the reinforcement structure to be held and comprising a plurality of circumferential cord windings cooperating with the adjacent portion of the reinforcement structure by means of an anchoring rubber mix, said cord windings of the anchoring zone being arranged so as to form at least one cord alignment extending between a first winding and a last winding in which the distance "d" between the cord of said first winding and its substantially adjacent portion of the carcass-type reinforcement structure and the distance "d" between the cord of said last winding and its substantially adjacent portion of the carcass-type reinforcement structure form a progression from the axial position of each of the windings relative to the carcass-type reinforcement structure.

The variation in distance between the circumferential cords and the carcass-type reinforcement structure as a function of the radial position of said circumferential cords makes it possible, for example, to reduce the difference between the levels of taking-up of the forces by each of the circumferential cords. Some circumferential cords are prevented from supporting a very large proportion of the load and being overloaded while others are underused. The anchoring zone is then more homogeneous, more robust and durable. As the forces can be distributed better, the ultimate stress levels withstood can be higher.

Said progression of the axial position of each of the windings relative to the carcass-type reinforcement structure is advantageously arranged such that:
  a first winding of said progression is arranged close to the reinforcement structure;
  a last winding of said progression is farthest from the reinforcement structure.

Said progression is preferably such that the winding closest to the reinforcement structure is the radially innermost of the progression. Thus, the distance "d" increases between said first winding located radially closest to the seat of said bead and said last winding located radially farthest from said seat.

According to this variant embodiment, since the radially upper circumferential cords are positioned at a greater distance from the carcass-type reinforcement structure, this enables this zone of the bead to have a certain flexibility of movement while avoiding the risk of contact between the circumferential cords and the cords of the reinforcement structure.

According to one advantageous embodiment, the winding closest to the reinforcement structure is the radially outermost of the progression. Thus, said progression is such that said distance "d" decreases between said first winding is located radially closest to the seat of said bead and said last winding located radially farthest from said seat.

This embodiment may make it possible to obtain a level of distribution of the forces which is substantially homogeneous.

According to one advantageous embodiment, the progression is substantially regular.

The angle α (alpha) between a cord alignment and the substantially adjacent portion of the carcass-type reinforcement structure is advantageously of between 10 and 30 degrees.

According to one advantageous variant of embodiment of the invention, said progression of the axial position of each of the windings relative to the carcass-type reinforcement structure is arranged such that:
  a first and a last winding of said progression are arranged in the vicinity of the reinforcement structure;
  the windings of said progression which are located between this first and this last winding are closer to the reinforcement structure than said first and said last winding.

Said progression may form an arc of a circle. Such a form of embodiment makes it possible to combine the advantages inherent in the examples of embodiment of FIGS. 1 and 2.

An alignment may comprise one or more cords. The alignments of cords may also be arranged and manufactured in several ways. For example, an alignment may advantageously be formed of a single cord wound (substantially at zero degrees) in a spiral over several turns, preferably from the smallest diameter towards the largest diameter. It may also be formed of a plurality of concentric cords laid one within another, such that rings of gradually increasing diameters are superposed. It is not necessary to add a rubber mix to impregnate the cord or the circumferential windings of cord. The cords may also be discontinuous along the circumferential path.

Some or all of the cords of the alignment is/are advantageously non-metallic, and preferably of textile type, such as cords based on aramid, aromatic polyester, or alternatively other types of cords of lower moduli such as cords based on PET, nylon, rayon, etc. These cords advantageously have a lower elasticity modulus than that of the metal wires of the anchoring zone.

Advantageously, the alignments of cords are arranged so as to be in contact with at least one rubber mix of high modulus.

In an advantageous example, the alignments are surrounded on a first side by a first mix and on the other side by a second mix.

BRIEF DESCRIPTION OF THE DRAWING

All the details of embodiment are given in the following description, supplemented by FIGS. 1 to 3, in which.

In these figures, identical numbers are used to represent similar elements.

DESCRIPTION OF PREFERRED EMBODIMENTS

Figure 1:
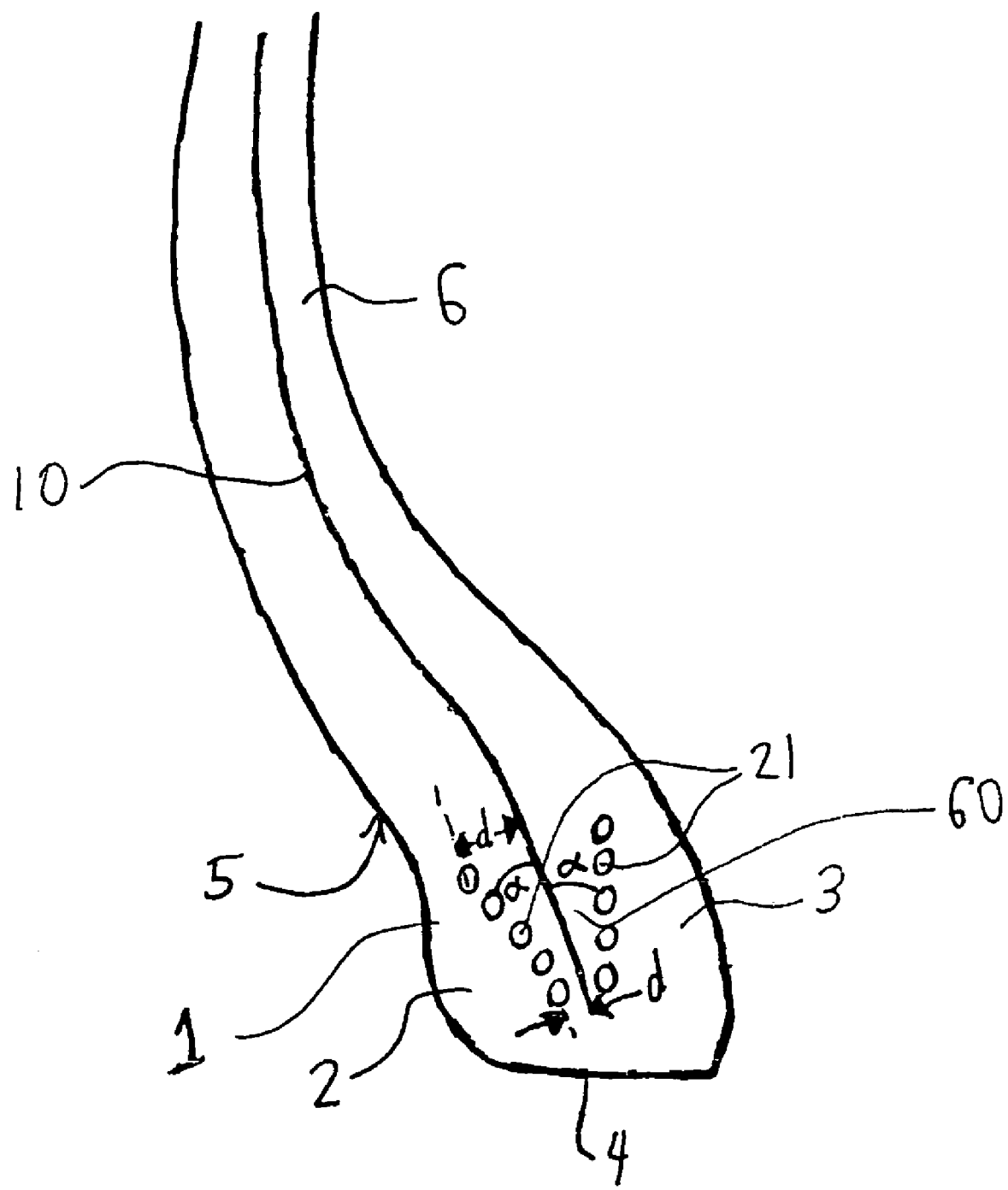
FIG. 1 is a radial section essentially showing a sidewall and a bead of a first form of embodiment of a tire according to the invention.

The reinforcement armature or reinforcement of the tires is currently—and most frequently—constituted by stacking one or more plies conventionally referred to as "carcass plies", "crown plies", etc. This manner of designating the reinforcement armatures comes from the manufacturing process, which consists of producing a series of semi-finished products in the form of plies, provided with cord reinforcing threads which are frequently longitudinal, which are subsequently assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, in order to obtain a product ready for vulcanisation.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, for this type of process, a portion of all the plies forming the carcass reinforcement (or of part only) is turned up around a bead wire arranged in the bead of the tire. In this manner, anchoring of the carcass reinforcement in the bead is created.

The fact that this conventional type of process is becoming more widespread in the industry, despite numerous variants in the manner of producing the plies and assemblies, has led the person skilled in the art to use a vocabulary modelled on the process; hence the generally accepted terminology, comprising in particular the terms "plies", "carcass", "bead wire", "shaping" to designate the change from a flat profile to a toroidal profile, etc.

However, there are nowadays tires which do not, properly speaking, comprise "plies" or "bead wires" in accordance with the preceding definitions. For example, document EP 0 582 196 describes tires manufactured without the aid of semi-finished products in the form of plies. For example, the cords of the different reinforcement structures are applied directly to the adjacent layers of rubber mixes, the whole being applied in successive layers on a toroidal core having a shape which makes it possible to obtain directly a profile similar to the final profile of the tire being manufactured. Thus, in this case, there are no longer any "semi-finished products", nor "plies", nor "bead wires". The base products, such as the rubber mixes and reinforcing threads in the form of cords or filaments, are applied directly to the core. As this core is of toroidal form, the blank no longer has to be shaped in order to move from a flat profile to a profile in the form of a torus.

Furthermore, the tires described in this document do not have the "conventional" upturn of the carcass ply around a bead wire. This type of anchoring is replaced by an arrangement in which circumferential filaments are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixed [word missing] comprising both certain semi-finished products for producing certain architectural aspects (such as plies, bead wires, etc), whereas others are produced from the direct application of mixes and/or reinforcing threads in the form of filaments.

In the present document, in order to take into account recent technological developments both in the field of manufacture and in the design of products, the conventional terms such as "plies", "bead wires", etc, are advantageously replaced by neutral terms or terms which are independent of the type of process used. Thus, the term "carcass-type reinforcing thread" or "sidewall reinforcing thread" is valid as a designation for the reinforcement cords of a carcass ply in the conventional process, and the corresponding cords, generally applied at the level of the sidewalls, of a tire produced in accordance with a process without semi-finished products. The term "anchoring zone", for its part, may equally well designate the "traditional" upturn of a carcass ply around a bead wire of a conventional process or the assembly formed by the circumferential filaments, the rubber mix and the adjacent sidewall reinforcement portions of a bottom zone produced with a process with application to a toroidal core.

In the present description, the term "cord" very generally designates both monofilaments and multifilaments or assemblies such as cables, plied yarns or alternatively any equivalent type of assembly, whatever the material and the treatment of these cords. They may, for example, be surface treatments, coating or pre-sizing in order to promote adhesion to the rubber. The expression "unitary cord" designates a cord formed of a single element, without assembly. The term "multifilaments" on the contrary designates an assembly of at least two unitary elements to form a cable, a plied yarn, etc.

It is known that, conventionally, the carcass ply or plies is/are turned up about a bead wire. The bead wire then performs a function of anchoring the carcass. Thus, in particular, it withstands the tension which develops in the carcass cords for example under the action of the inflation pressure. The arrangement described in the present document makes it possible to provide a similar anchoring function. It is also known to use the bead wire of conventional type to provide a function of clamping the bead on a rim. The arrangement described in the present document also makes it possible to provide a similar clamping function.

In the present description, "bonding" rubber or mix is understood to mean the rubber mix possibly in contact with the reinforcement cords, adhering to the latter and capable of filling the interstices between adjacent cords.

"Contact" between a cord and a layer of bonding rubber is understood to mean the fact that at least part of the outer circumference of the cord is in intimate contact with the rubber mix constituting the bonding rubber.

"Sidewalls" refers to the portions of the tire, most frequently of low flexural strength, located between the crown and the beads. "Sidewall mix" refers to the rubber mixes located axially to the outside relative to the cords of the reinforcement structure of the carcass and to their bonding rubber. These mixes usually have a low elasticity modulus.

"Bead" refers to the portion of the tire adjacent radially internally to the sidewall. "Elasticity modulus" of a rubber mix is understood to mean a secant modulus of extension obtained at a uniaxial deformation of extension of the order of 10% at ambient temperature.

As a reminder, "radially upwards" or "radially upper" or "radially externally" means towards the largest radii.

A reinforcement or reinforcing structure of carcass type will be said to be radial when its cords are arranged at 90°, but also, according to the terminology in use, at an angle close to 90°.

"Characteristics of the cord" is understood to mean, for example, its dimensions, its composition, its characteristics and mechanical properties (in particular the modulus), its chemical characteristics and properties, etc.

The distance "d" is the distance between a cord 21 and the adjacent portion of the carcass-type reinforcement structure, measured from a line substantially perpendicular to said structure and passing through the cord.

The angle "α" (alpha) is the angle between the carcass-type reinforcement structure and an axis of the cord alignment formed by the anchoring cords.

Figure 2:
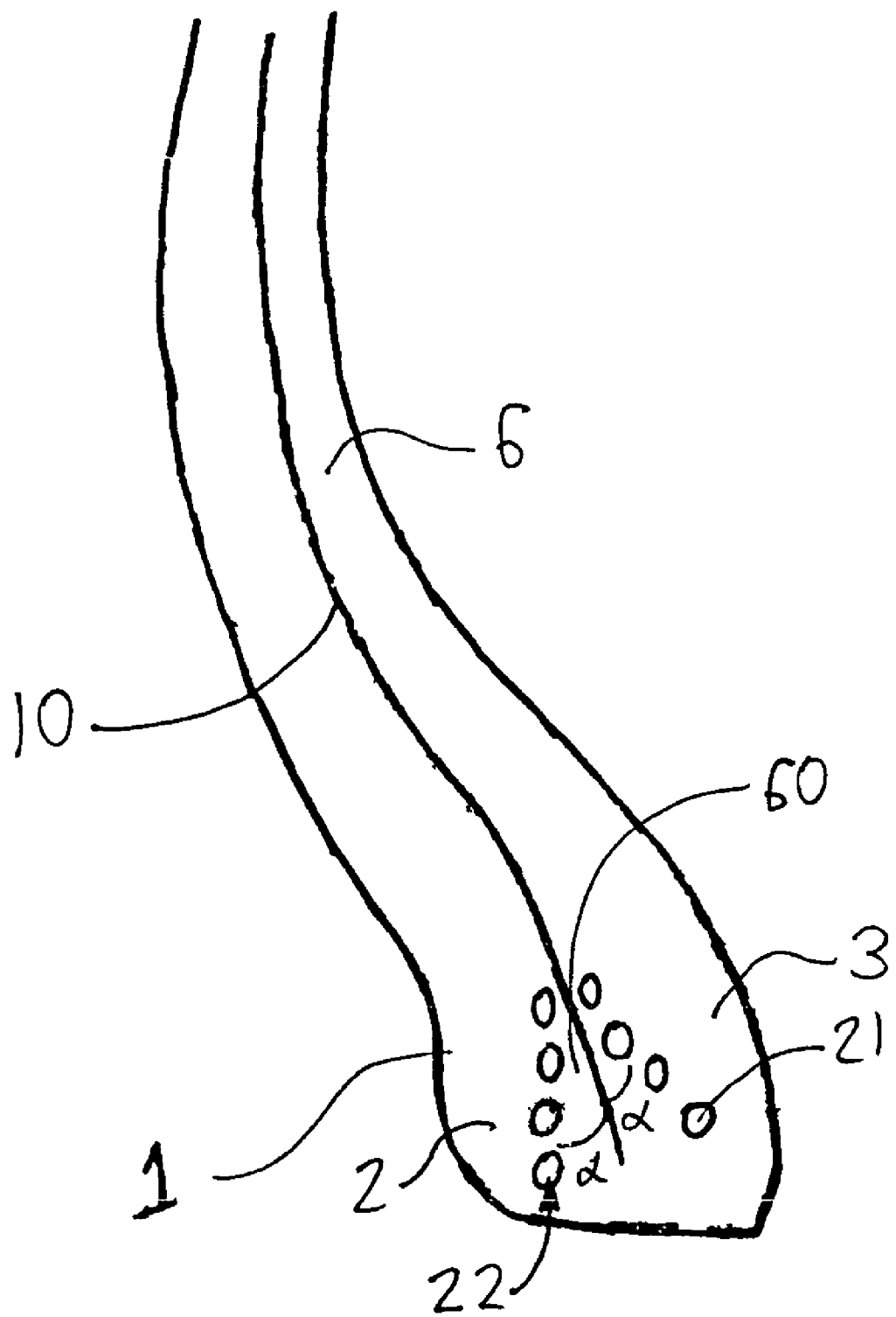
FIG. 2 is a radial section showing essentially a sidewall and a bead of another s example of embodiment of the invention.

FIG. 1 shows the bottom zone, in particular the bead 1 of a first form of embodiment of the tire according to the invention. The bead 1 comprises an axially outer portion 2 which is provided and shaped so as to be placed against the flange of a rim. The upper portion, or radially outer portion, of the portion 2 forms a portion 5 adapted to the rim hook. This portion is frequently curved axially towards the outside, as illustrated in FIGS. 1 and 2. The portion 2 ends radially and axially towards the inside in a bead seat 4 which is adapted to be placed against a rim seat. The bead also comprises an axially inner portion 3, which extends substantially radially from the seat 4 towards the sidewall 6.

The tire also comprises a reinforcement or reinforcing structure 10 of carcass type provided with reinforcements which are advantageously shaped in a substantially radial arrangement. This structure may be arranged continuously from one bead to the other, passing through the sidewalls and the crown of the tire, or alternatively it may comprise two or more parts, arranged for example along the sidewalls, without covering the entire crown.

In order to position the reinforcement cords as accurately as possible, it is very advantageous to build the tire on a rigid support, for example a core which imposes the shape of its inner cavity. There are applied to this core, in the order required by the final architecture, all the constituents of the tire, which are arranged directly in their final position, without the profile of the tire having to be modified during building.

Circumferential cords 21 preferably arranged in the form of stacks 22 form an arrangement of anchoring cords, provided in each of the beads. These cords are preferably metallic, and possibly brass-coated. Various variants advantageously provide for cords which are textile in nature, such as, for example of aramid, nylon, PET, PEN, or hybrid. In each stack, the cords are advantageously substantially concentric and superposed.

In order to ensure perfect anchoring of the reinforcement structure, a stratified composite bead is produced. Within the bead 1, between the cord alignments of the reinforcement structure, there are arranged the circumferentially oriented cords 21. These are arranged in a stack 22 as in the drawings, or in a plurality of adjacent stacks, or in any suitable arrangement, depending on the type of tire and/or the desired characteristics.

The radially inner end portions of the reinforcement structure 10 cooperate with the cord windings. Anchoring of these portions in said beads is thus created. In order to promote this anchoring, the space between the circumferential cords and the reinforcement structure is occupied by a bonding or anchoring rubber mix 60. It is also possible to provide for the use of a plurality of mixes having different characteristics, defining a plurality of zones, the combinations of mixes and the resultant arrangements being virtually unlimited. By way of non-limitative example, the elasticity modulus of such a mix may reach or exceed 10 to 15 MPa, and even in some cases reach or even exceed 40 MPa.

The arrangements of cords may be arranged and manufactured in several ways. For example, a stack may advantageously be formed of a single cord wound (substantially at zero degrees) in a spiral over several turns, preferably from the smallest diameter towards the largest diameter. A stack may also be formed of a plurality of concentric cords laid one in another, so that rings of gradually increasing diameter are superposed. It is not necessary to add a rubber mix to impregnate the reinforcement cord, or circumferential windings of cord.

The stacks 22 are arranged so as to produce progressive anchoring of the carcass-type reinforcement structure. Thus, each of the stacks 22 forms an angle or an inclination relative to the adjacent portion of carcass-type reinforcement structure so as to be non-parallel thereto. For example, in FIG. 1, the angle α is open radially outwards for each of the stacks 22. In the radially outer portion 2 of the bead, the stack is oriented (as one moves away from the seat 4) radially and axially outwards, such that the distance "d" between the cords 21 and the adjacent portion of reinforcement structure 10 becomes increasingly large as one moves radially outwards. The stack 22 located on the other side 3 of the structure 10 is inclined symmetrically, such that the distance "d", between the cords 21 and the adjacent portion of reinforcement structure 10 becomes increasingly large as one moves radially outwards. In this latter case, the stack is oriented (as one moves away from the seat 4) radially outwards with an axial inclination of substantially zero, or slightly towards the inside.

In FIG. 2, the inclination of the stacks 22 is the reverse of that of the example of FIG. 1. Thus, the angle α is open radially towards the inside for each of the stacks 22. In the radially outer portion 2 of the bead, the stack is oriented (as one moves towards the seat 4) radially internally, with a substantially zero axial inclination, or slightly towards the inside or towards the outside, such that the distance "d", between the cords 21 and the adjacent portion of reinforcement structure 10 becomes increasingly large as one moves radially inwards. The stack 22 located on the other side 3 of the structure 10 is inclined symmetrically, such that the distance "d" between the cords 21 and the adjacent portion of reinforcement structure 10 becomes increasingly large as one moves radially inwards. In this latter case, the stack is oriented (as one moves towards the seat 4) radially and axially inwards.

Figure 3:
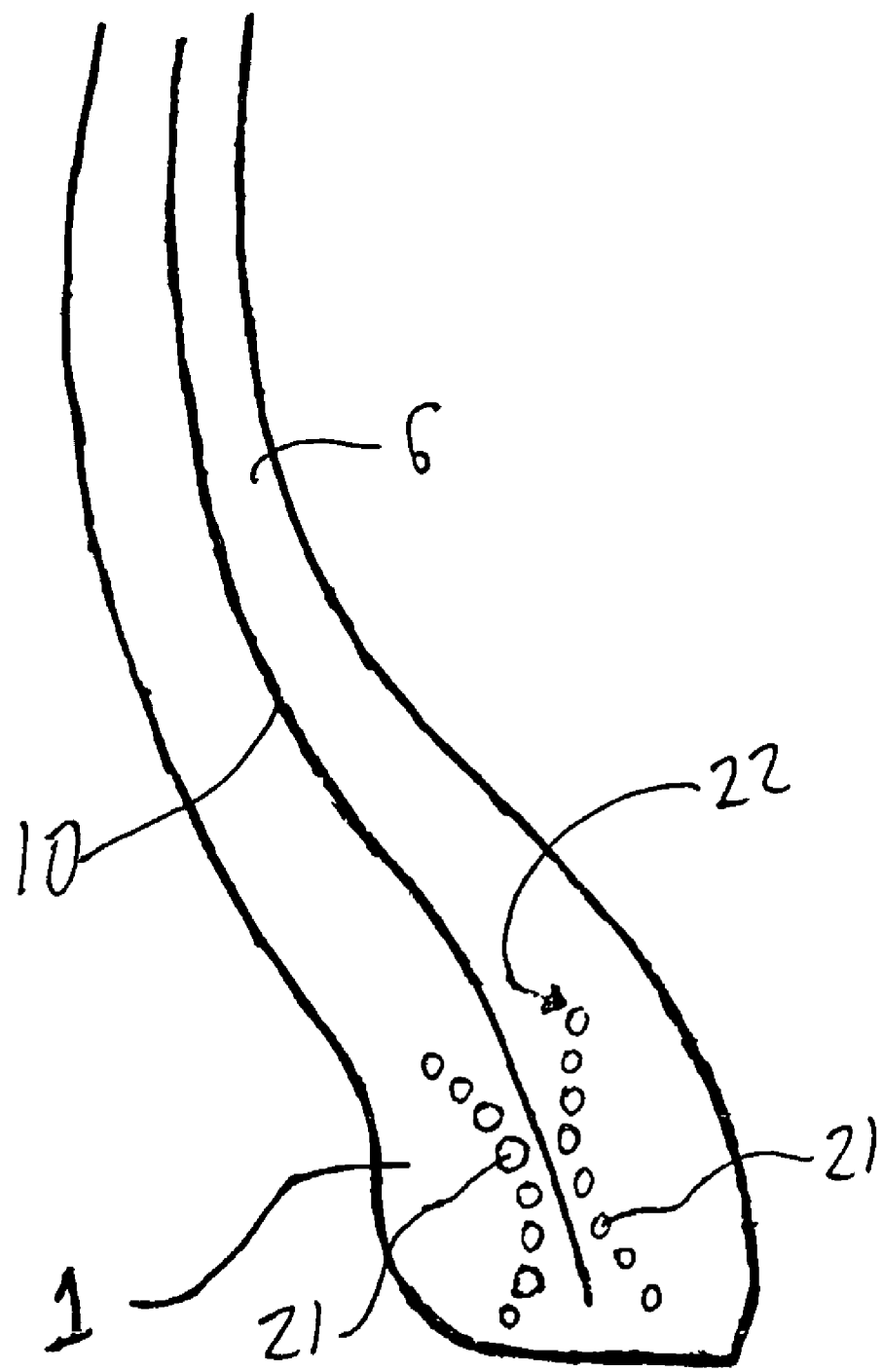
FIG. 3 is a radial section showing essentially a sidewall and a bead of a third example of embodiment of the invention.

The arrangement of the stacks 22 of the example of embodiment of FIG. 3 uses the special features of the preceding two examples. Thus, the radially outer cords 21 are arranged similarly to those of the example of embodiment of FIG. 1, whereas the radially inner cords 21 are arranged similarly to those of the example of embodiment of FIG. 2, thus forming a central zone in which the cords are closer to the carcass-type reinforcement structure than in the two radially inner and outer end zones.

FIG. 3 shows an embodiment in which the stacks form two half-moons arranged side by side, opposite one other, their rounded portions facing one another, with the interposition of the carcass-type reinforcement structure, thus forming a substantially symmetrical arrangement. Such an arrangement contributes to obtaining good homogeneity of the bottom zone of the tire.

In all these examples, the number of stacks on each side of the reinforcement structure may of course vary. The adjacent stacks, located on one and the same side of the structure 10, are then preferably oriented substantially parallel.

The invention claimed is:

1. A tire comprising at least one carcass-type reinforcement structure anchored on either side of the tire in a bead, the base of which is intended to be mounted on a rim seat, each bead being extended radially towards the outside by a sidewall, the sidewalls radially towards the outside joining a tread, the carcass-type reinforcement structure extending circumferentially from the bead towards said sidewall, a crown reinforcement, each of the beads furthermore comprising an anchoring zone permitting the reinforcement structure to be held and comprising a plurality of circumferential cord windings cooperating with the adjacent portion of the reinforcement structure by an anchoring rubber mix, said cord windings of the anchoring zone being arranged so as to form at least one cord stack extending between a first winding and a last winding in which the distance "d" between the cord of said first winding and its substantially adjacent portion of the carcass-type reinforcement structure and the distance "d" between the cord of said last winding and its substantially adjacent portion of the carcass-type reinforcement structure form a progression from the axial position of each of the windings relative to the carcass-type reinforcement structure, wherein said plurality of circumferential cord windings directly cooperates with the adjacent portion of the carcass-type reinforcement structure, wherein the winding closest to the reinforcement structure is the radially outermost of the progression.

2. A tire according to claim 1, in which said progression is substantially regular.

3. A tire according to claim 2, in which the angle α (alpha) between a cord alignment and the substantially adjacent portion of the carcass-type reinforcement structure is between 10 and 30 degrees.

4. A tire comprising at least one carcass-type reinforcement structure anchored on either side of the tire in a bead, the base of which is intended to be mounted on a rim seat, each bead being extended radially towards the outside by a sidewall, the sidewalls radially towards the outside joining a tread, the carcass-type reinforcement structure extending circumferentially from the bead towards said sidewall, a crown reinforcement, each of the beads furthermore comprising an anchoring zone permitting the reinforcement structure to be held and comprising a plurality of circumferential cord windings cooperating with the adjacent portion of the reinforcement structure by an anchoring rubber mix, said cord windings of the anchoring zone being arranged so as to form at least one cord stack extending between a first winding and a last winding in which the distance "d" between the cord of said first winding and its substantially adjacent portion of the carcass-type reinforcement structure and the distance "d" between the cord of said last winding and its substantially adjacent portion of the carcass-type reinforcement structure form a progression from the axial position of each of the windings relative to the carcass-type reinforcement structure, wherein said plurality of circumferential cord windings directly cooperates with the adjacent portion of the carcass-type reinforcement structure, wherein said progression of the axial position of each of the windings relative to the carcass-type reinforcement structure is arranged such that:
 a first and a last winding of said progression are arranged in the vicinity of the reinforcement structure; and
 the windings of said progression which are located between this first and this last winding are closer to the reinforcement structure.

5. A tire comprising at least one carcass-type reinforcement structure anchored on either side of the tire in a bead, the base of which is intended to be mounted on a rim seat, each bead being extended radially towards the outside by a sidewall, the sidewalls radially towards the outside joining a tread, the carcass-type reinforcement structure extending circumferentially from the bead towards said sidewall, a crown reinforcement, each of the beads furthermore comprising an anchoring zone permitting the reinforcement structure to be held and comprising a plurality of circumferential cord windings cooperating with the adjacent portion of the reinforcement structure by an anchoring rubber mix, said cord windings of the anchoring zone being arranged so as to form at least one cord stack extending between a first winding and a last winding in which the distance "d" between the cord of said first winding and its substantially adjacent portion of the carcass-type reinforcement structure and the distance "d" between the cord of said last winding and its substantially adjacent portion of the carcass-type reinforcement structure form a progression from the axial position of each of the windings relative to the carcass-type reinforcement structure, said progression forming an arc of a circle.

6. A tire according to claim 5, in which said progression of the axial position of each of the windings relative to the carcass-type reinforcement structure is arranged such that:
 a first and a last winding of said progression are arranged in the vicinity of the reinforcement structure;

the windings of said progression which are located between this first and this last winding are closer to the reinforcement structure.

7. A tire comprising at least one carcass-type reinforcement structure anchored on either side of the tire in a bead, the base of which is intended to be mounted on a rim seat, each bead being extended radially towards the outside by a sidewall, the sidewalls radially towards the outside joining a tread, the carcass-type reinforcement structure extending circumferentially from the bead towards said sidewall, a crown reinforcement, each of the beads furthermore comprising an anchoring zone permitting the reinforcement structure to be held and comprising a plurality of circumferential cord windings cooperating with the adjacent portion of the reinforcement structure by an anchoring rubber mix, said cord windings of the anchoring zone being arranged so as to form at least one cord stack extending between a first winding and a last winding in which the distance "d" between the cord of said first winding and its substantially adjacent portion of the carcass-type reinforcement structure and the distance "d" between the cord of said last winding and its substantially adjacent portion of the carcass-type reinforcement structure form a progression from the axial position of each of the windings relative to the carcass-type reinforcement structure, wherein the at least one cord stack is oriented non-parallel to the adjacent portion of the carcass-type reinforcement structure and said plurality of circumferential cord windings directly cooperates with the adjacent portion of the carcass-type reinforcement structure, the rubber mix disposed between the at least one cord stack and the adjacent portion of the carcass-type reinforcement structure being devoid of a cord alignment oriented parallel to such adjacent portion, wherein said progression is substantially regular, and the angle α (alpha) between a cord stack and the substantially adjacent portion of the carcass-type reinforcement structure is between 10 and 30 degrees.

8. A tire according to claim 7, in which said progression of the axial position of each of the windings relative to the carcass-type reinforcement structure is arranged such that:

a first winding of said progression is arranged closer to the reinforcement structure than is a last winding thereof.

9. A tire according to claim 7, in which said progression is such that the winding closest to the reinforcement structure is the radially innermost of the progression.

* * * * *